O. A. COLBY.
INDUCTION LIQUID HEATER.
APPLICATION FILED APR. 7, 1920.

1,367,125. Patented Feb. 1, 1921.

WITNESSES:
J. A. Helsel
N. M. Biebel

INVENTOR
Ora A. Colby.
BY
Wesley G. Carr
ATTORNEY

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

INDUCTION LIQUID-HEATER.

1,367,125.   Specification of Letters Patent.   Patented Feb. 1, 1921.

Application filed April 7, 1920. Serial No. 372,018.

*To all whom it may concern:*

Be it known that I, ORA A. COLBY, a citizen of the United States, and a resident of Irwin, in the county of Westmoreland and State of Pennsylvania, have invented a new and useful Improvement in Induction Liquid-Heaters, of which the following is a specification.

My invention relates to liquid heaters and particularly to induction liquid heaters, and it has for one of its objects to provide a heater employing a modified form of transformer which induces a heating current of electricity in a suitable liquid-carrying conduit and in which the unlaminated core of the transformer comprises a tubular liquid-carrying member which operates also as a return circuit for the current in the secondary coil.

This application is a continuation, in part, of application Serial No. 279,157, filed by me on February 25, 1919, and covers an improvement upon one of the devices shown therein.

More specifically, my invention embodies a primary coil, an unlaminated magnetic tubular liquid-carrying core member having a closed magnetic circuit and a secondary coil comprising a liquid-carrying tubular member disposed about a part of said core member and electrically connected thereto.

Figure 1:
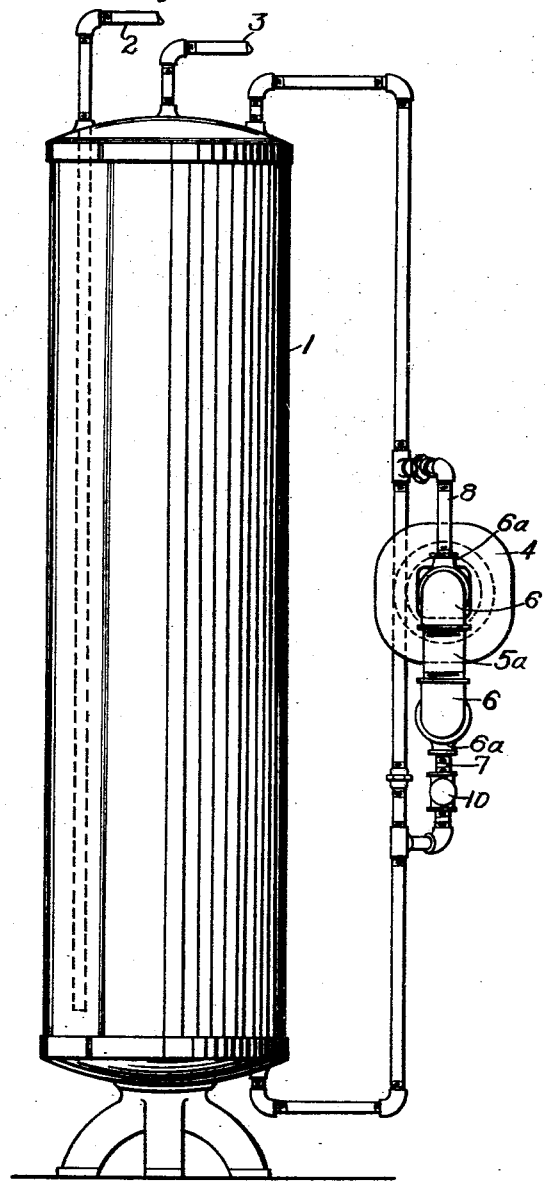
Figure 2:
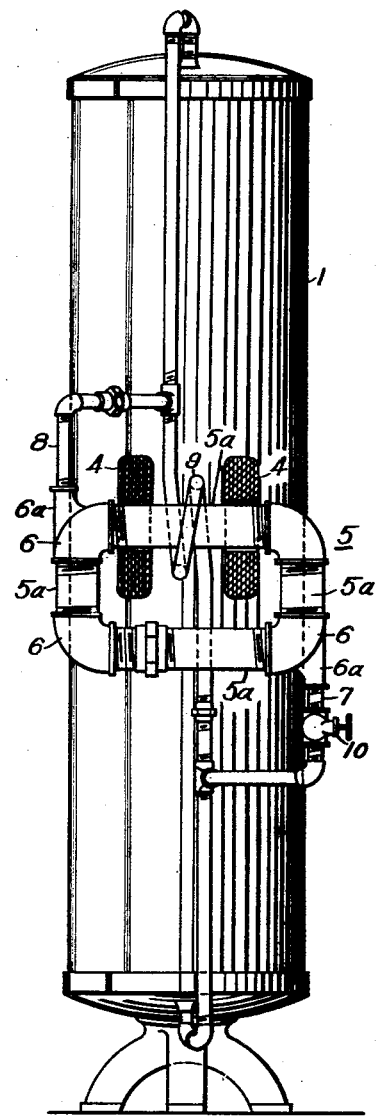

In the single sheet of drawings, Figure 1 is a view, in side elevation, of the device embodying my invention, and Fig. 2 is a view in side elevation, taken at an angle of 90° from that of Fig. 1.

I have shown the device as applied to an ordinary water tank 1, such as is commonly used in homes to store hot water, and a suitable inlet pipe 2 and an outlet pipe 3 are shown. While I have shown this particular application, I do not wish to be restricted thereto as it is evident that my device may be applied to containers of other forms in which a liquid is to be heated.

A plurality of primary coils 4 are shown which are to be understood as being so designed as to be adapted to the voltage and periodicity of the supply circuit to which the coils are to be connected by means of suitable lead wires (not shown).

A core member 5 for the primary magnetizing coils 4 comprises a substantially rectangular tubular frame built up of standard pieces of pipe 5a and of members 6 of L-shape such as are used in ordinary plumbing work. Two of the L-shaped members 6, located at diagonally opposite points of the core member 5, are provided, respectively, with projections 6a into which suitable pieces of pipe 7 and 8 may be firmly secured. It is to be understood that the core member 5 is to be so constructed that it may be assembled to perform the functions desired.

A secondary member 9 comprises a tube of relatively small diameter which may be formed as a helix so as to be disposed around one part of the core member 5 and be subjected to the alternating magnetic flux set up in the core member 5 but to be electrically insulated therefrom. Additional tubular pieces and fittings are so arranged that the terminals of the secondary coil may be electrically connected to the pipe members 7 and 8, a valve 10 being included at one side so that the amount of water flowing through the core member 5 may be regulated as desired. It may be noted that the core member 5 has a relatively large diameter and that the tubular secondary member 9 has a relatively small diameter and that, therefore, the electrical resistance of the secondary coil will be relatively high, while the electrical resistance of the core member 5 will be relatively low, as will also be its magnetic reluctance.

The operation of the device is as follows: Assuming that the inlet and outlet pipes 2 and 3 are respectively connected to a suitable supply of liquid and to a suitable outlet and that the primary coil 4 is connected to a suitable supply circuit, the latter will set up an alternating magnetomotive force which will cause an alternating flux to flow through the walls of the tubular member 5 which, as shown in the drawings, constitutes a closed magnetic circuit. The alternating flux will induce an alternating electromotive force of low value in the secondary coil 9 and an alternating current will flow therein through a return circuit which comprises the pipe members 7 and 8 and both parts of the tubular core member 5. As the secondary coil 9 is of relatively small cross section, it will have, as above stated, a relatively high resistance, and a relatively high energy loss will occur in the secondary coil 9, thus heating the pipe and, consequently, raising the temperature of the liquid flowing therethrough.

As the tubular core member 5 is not laminated, eddy currents are induced therein, resulting in a tendency to raise its temperature which tendency is counteracted by the liquid flowing therethrough. If it is desired, the amount of liquid flowing through the tubular member 5 may be reduced to a relatively small amount by means of the valve 10 so that the rise of temperature of the liquid flowing through the tubular member 5 may be made substantially equal to that of the water flowing through the secondary coil 9.

I thus provide a relatively compact induction liquid heater in which the core member acts also as a liquid carrier and tends to heat the liquid flowing therethrough, as well as acting as a return electrical circuit for the currents induced in the secondary coil which constitutes the main heating member.

While I have shown a specific embodiment of my invention, various changes may be made therein without departing from the spirit and scope of my invention and I desire that only such limitations shall be placed thereon as are imposed by the prior art or are specifically set forth in the appended claims.

I claim as my invention:

1. In an electrical water-heating apparatus, the combination with a primary coil, of a hollow liquid-carrying core, and a secondary member constituting a conduit for the water to be heated.

2. In an electrical liquid heater, the combination with a primary coil, of a secondary member constituting a conduit for the liquid to be heated, and a hollow liquid-carrying core member for said primary and secondary members, said core member being electrically connected to said secondary member.

3. In an electrical liquid-heating apparatus, the combination with a primary coil, of a hollow liquid-carrying core member extending through said primary coil and a secondary coil comprising a tubular fluid-carrying member disposed about said core member and electrically connected thereto.

4. In an electrical liquid-heating apparatus, the combination with a primary coil, of a hollow liquid-carrying core member having a relatively low resistance and extending through said primary coil, and a secondary coil comprising a tubular fluid-carrying member of relatively high electrical resistance disposed about said core member and electrically connected thereto.

5. In an electrical liquid-heating apparatus, the combination with a primary coil, of a hollow liquid-carrying core member of relatively low resistance having a part extending through said primary coil, and a secondary coil comprising a fluid-carrying tubular member disposed about said core member and electrically connected thereto.

6. In an electrical fluid-heating apparatus, the combination with a primary coil, of a hollow unlaminated liquid-carrying magnetic core and a secondary coil comprising a tubular liquid-carrying member electrically connected to said core.

7. In an electrical liquid-heating apparatus, the combination with a primary coil, of a tubular liquid-carrying secondary coil, a hollow liquid-carrying magnetic core member for said primary and secondary coils, said core member being electrically connected to said secondary coil, and means for varying the relative amounts of water flowing through said secondary coil and said core member.

8. In an electrical induction water-heating apparatus, the combination with a container for the water being heated, of a primary coil, a hollow water-carrying magnetic member having a part extending through said primary coil and constituting a core for said coil, a tubular water-carrying member disposed around said magnetic core member and constituting the secondary coil, means for electrically connecting said core member and said secondary coil and means for varying the relative amounts of water flowing through said secondary coil and said core member.

9. In an induction liquid-heating apparatus, the combination with a primary coil, of a hollow liquid-carrying magnetic core member having a closed magnetic circuit, and a tubular fluid-carrying secondary member disposed about a part of said core member and electrically connected thereto.

10. In an induction liquid-heating apparatus, the combination with a primary coil, of a hollow liquid-carrying magnetic core member having a closed magnetic circuit and having relatively low resistance, and a secondary coil comprising a fluid-carrying tubular member of relatively high resistance disposed about a part of said core member and electrically connected thereto.

In testimony whereof, I have hereunto subscribed my name this 30th day of March 1920.

ORA A. COLBY.